Feb. 26, 1952  G. A. LEE ET AL  2,587,338
AUTOMATIC MACHINE FOR MEASURING GRANULAR MATERIALS
Filed Dec. 23, 1949  2 SHEETS—SHEET 1

Inventors
G. A. Lee
A. R. Smith
C. J. Hopkins
By Glascock Downing Hulse Att'ys

Patented Feb. 26, 1952

2,587,338

UNITED STATES PATENT OFFICE 2,587,338

AUTOMATIC MACHINE FOR MEASURING GRANULAR MATERIALS

George Arthur Lee, Cuffley, Arthur Ronald Smith, Birmingham, and Cyril John Hopkins, Cuffley, England Application December 23, 1949, Serial No. 134,641
In Great Britain January 1, 1949

1 Claim. (Cl. 222—361)

This invention has for its object to provide an improved automatic machine for measuring quantities of free-flowing granular materials, and particularly seeds.

In the accompanying drawings—

Figure 1:
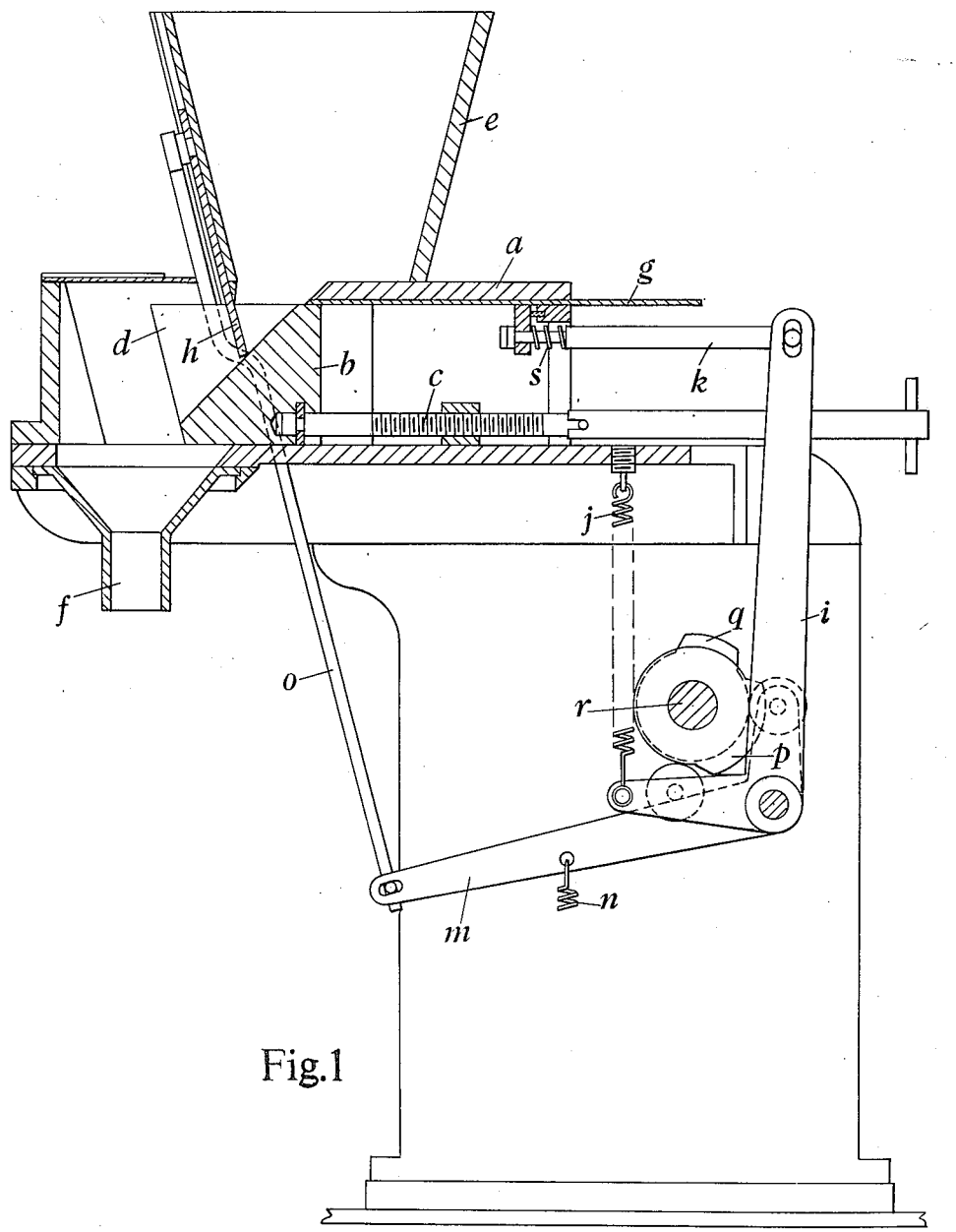
Figure 2:
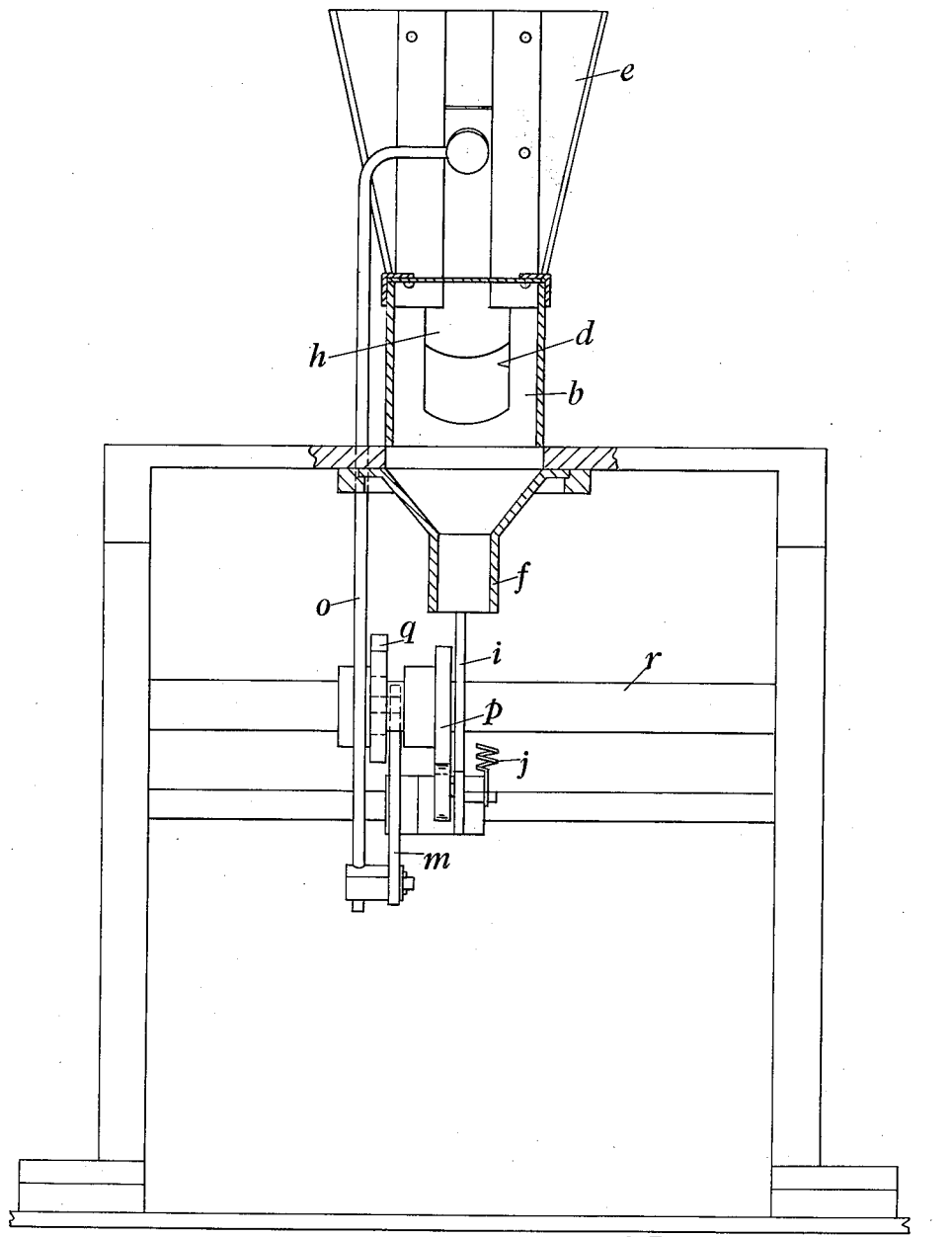

Figure 1 is a sectional side elevation and Figure 2 is a sectional front elevation of a machine embodying the invention.

Referring to the drawings, there is employed a hollow body part $a$, in which is mounted (with freedom for sliding in a horizontal direction) a block $b$, this block being movable for adjustment by a manually operable screw $c$. In the block is formed an inclined trough $d$ forming the measuring chamber and extending from the upper side to one end of the block, the trough being preferably formed with a base of concave shape (as shown, for example, in Figure 2). Above the trough there is mounted on the body part $a$ a feed hopper $e$ which at its lower end is open to the entrance of the trough, and adjacent to the discharge end of the trough there is provided on the underside of a body part a discharge nozzle $f$ adapted to discharge the measured material to a packet or other receptacle.

Between the upper side of the measuring block and the lower end of the hopper is arranged a reciprocatory member $g$ for controlling the flow into the measuring chamber, and on one of the outer sides of the hopper is mounted another reciprocatory member $h$ for controlling the discharge. At its lower end the member $h$ is shaped to a form corresponding to the base of the trough. Moreover the lower end portion of this member can extend into the trough and form one wall of the measuring chamber.

For actuating the reciprocatory member $g$ there is provided a lever $i$ loaded by a spring $j$, this lever being connected to the said member by a link $k$, and for actuating the reciprocatory member $h$ there is provided a lever $m$ connected to the member $h$ by a link $o$. The levers $i$, $m$ are operable by cams $p$, $q$ on a shaft $r$ which is driven from any convenient source of motion. The link $k$ is preferably connected to the member $g$ through a spring $s$ which allows the said member to be arrested at the end of its forward movement independently of any continued movement of the lever. The lever $m$ (and associated cam) is preferably arranged to impart the upward movement to the member $h$, the return movement being effected by gravity or a spring $n$.

The mode of action of the machine is as follows:

Starting with the inflow controlling member $g$ in its retracted position, the lower end of the outflow controlling member $h$ then extends into the measuring chamber $d$. By appropriate adjustment of the position of the part $b$ relatively to the outflow controlling member $h$, the effective volume of the measuring chamber $d$ can be reduced or enlarged as desired, and by reason of the oblique disposition of the base of the said chamber the volume can be varied over a wide range with a measuring chamber of small compass.

With the parts in the above described positions material flows from the hopper $e$ and fills the measuring chamber. The inflow controlling member $g$ is then advanced for isolating the hopper from the measuring chamber, and the outflow controlling member $h$ is raised to allow the contained material to be discharged by gravity to the nozzle $f$.

By this invention we are able to provide an automatic machine for measuring quantities of free-flowing granular or like materials in a very simple and convenient form. The invention is not, however, restricted to the example described, as subordinate constructional or mechanical details may be varied to suit different requirements.

Having thus described our invention what we claim as new and desire to secure by Letters Patent is:

An automatic machine for measuring quantities of granular material, comprising in combination a hollow body having an inlet and an outlet for the material to be measured, a member adjustably located in said body and provided with a trough having an inclined base along which material from the inlet can flow towards the outlet, a reciprocatory member slidable into and out of a position in which it abuts at one end against the inclined base of the trough and forms with the latter a measuring chamber for the material, means whereby the member provided with the trough is adjustable relatively to the reciprocatory member for varying the effective volume of the measuring chamber, a second reciprocatory member slidable into and out of a position in which it covers the upper end of the measuring chamber, and means for actuating the two reciprocatory members in sequence to permit inflow of material from the inlet to the measuring chamber, and outflow of material from the measuring chamber to the outlet.

GEORGE ARTHUR LEE.
ARTHUR RONALD SMITH.
CYRIL JOHN HOPKINS.

REFERENCES CITED

The following references are of record in the file of this patent:

UNITED STATES PATENTS

| Number | Name | Date |
|---|---|---|
| 852,718 | Hemstreet | May 7, 1907 |
| 998,902 | Hoyt | July 25, 1911 |
| 2,138,742 | McBrayer | Nov. 29, 1938 |

FOREIGN PATENTS

| Number | Country | Date |
|---|---|---|
| 613,137 | Germany | May 13, 1935 |